United States Patent [19]

Moreland et al.

[11] Patent Number: 5,364,511
[45] Date of Patent: Nov. 15, 1994

[54] CATHODIC PROTECTION SYSTEM AND A COATING AND COATING COMPOSITION THEREFOR

[75] Inventors: Peter J. Moreland, Frodsham, England; Frans L. Jozef de Peuter, Mol,

[73] Assignee: Zeneca Limited, London, England

[21] Appl. No.: 94,291

[22] Filed: Jul. 21, 1993

[30] Foreign Application Priority Data

Jul. 21, 1992 [GB] United Kingdom ............ 9215502

[51] Int. Cl.$^5$ ............................................. G23F 13/00
[52] U.S. Cl. ................................... 204/196; 204/197
[58] Field of Search ............................ 204/196, 197

[56] References Cited

U.S. PATENT DOCUMENTS

| | | | |
|---|---|---|---|
| 4,172,182 | 10/1979 | Stacy | 429/104 |
| 4,255,241 | 3/1981 | Kroon et al. | 204/196 |
| 4,395,159 | 7/1983 | Karuks et al. | 427/403 |
| 4,596,670 | 6/1986 | Liu | 252/511 |
| 4,812,212 | 3/1989 | Dimond et al. | 204/196 |
| 5,055,166 | 10/1991 | Schutt | 204/196 |
| 5,183,694 | 2/1993 | Webb | 204/196 |

FOREIGN PATENT DOCUMENTS

| | | |
|---|---|---|
| 0180431 | 5/1986 | European Pat. Off. . |
| 0407348 | 1/1991 | European Pat. Off. . |
| 0499439 | 8/1992 | European Pat. Off. . |
| 2170512 | 8/1986 | United Kingdom . |
| 8604099 | 7/1986 | WIPO . |
| 9109155 | 6/1991 | WIPO . |

*Primary Examiner*—John Niebling
*Assistant Examiner*—Kishor Mayekar
*Attorney, Agent, or Firm*—Cushman, Darby & Cushman

[57] ABSTRACT

Cathodic protection system for the cathodic protection of a reinforced concrete structure, which system comprises a concrete structure containing steel reinforcement bars and an electrically-conductive coating bonded to an external surface and in electrical contact with the structure, and wherein said electrically conductive coating is a non-cementitious coating comprising a matrix of an organic polymer containing electrical conductivity-providing particles of carbon coated with a conductive metal of a type possessing a natural passive oxide film which is itself electrically conductive, and an alkaline buffer material or combination of materials for inhibiting or preventing the build up of acidity in the coating when the cathodic protection system is in operation.

10 Claims, No Drawings

CATHODIC PROTECTION SYSTEM AND A COATING AND COATING COMPOSITION THEREFOR

The present invention relates to a system for the cathodic protection of reinforcement bars in a reinforced concrete structure, to an electrically conductive coating for such a system, and to a coating composition for the provision of such a coating.

A substantial problem has arisen in recent years with steel-reinforced concrete structures, the problem being associated with the corrosion of the reinforcement bars in the structure, these steel reinforcement bars hereafter being referred to as rebars.

The corrosion of rebars in a steel-reinforced concrete structure may be caused by the presence of water in the porous concrete of the structure containing dissolved carbon dioxide from the atmosphere, and/or by the presence of chloride ions in this water. Chloride ions may be present as a result of the use of chloride contaminated aggregate in the production of the concrete, and/or as a result of addition of calcium chloride as a setting accelerator for the cement in the concrete structure, and/or by the use of chloride-containing de-icing salts on the structure which percolate into the porous concrete of the structure and come into contact with the rebars. The ingress of such chloride-containing de-icing salts into reinforced concrete structures is a particularly severe problem with structures such as highway bridges, particularly bridge decks and their sub-structures, and parking garages. The rebars in reinforced concrete structures in or near marine developments are also subject to corrosion as a result of ingress of corrosive chloride-containing salts into the structures.

Corrosion of the rebars in such a structure may lead to a relatively minor problem of discoloration of the structure caused by rust streaks, through spalling and cracking of the concrete of the structure caused by the increase in volume of the rust compared with that of the steel of the rebar, up to complete and possibly catastrophic failure of the structure itself as a result of substantial corrosion resulting in failure of the rebars. There have been several instances of complete failure of such structures as a result of corrosion-related failure of the rebars in the structure.

It is well known that the corrosion of rebars may be inhibited or prevented by causing the rebars to become cathodic, that is corrosion may be inhibited or prevented by application of so-called cathodic protection to the rebars.

Many different systems have been proposed for the cathodic protection of such rebars in all of which an electrode which in operation functions as an anode is in electrical contact with the structure, the electrolyte is provided by the water or salt solution which is present in the porous concrete of the structure, and the rebars are cathodically polarised and corrosion is thereby inhibited or prevented. All these systems fall into two basic types.

In the first type of system the electrode which in operation of the system functions as an anode is a sacrificial anode and current is caused to flow as a result of galvanic action. In operation of this system an external source of electrical power is not required. An example of such a system is a sacrificial anode in the form of a plurality strips of zinc or in the form of a perforated zinc sheet. Such a system suffers from a disadvantage that in operation the sacrificial anode is consumed and it must be renewed periodically.

In the second type of system, the so-called impressed current type, which is more widely used in practice, the electrode which in operative functions an an anode is "permanent" in the sense that it is not consumed at a significant rate in operation of the system, and operation of the system depends upon application of an external source of electrical power rather than on galvanic action. Many systems of this second type have been proposed and some will be described merely by way of example.

In one such system the anode may be in the form of a flexible wire, e.g. a platinum wire, which is installed in slots in the concrete structure with the slots being covered by a carbonaceous or other electrically conductive backfill.

In published European Patent application 0 147 977 there is described a cathodic protection system in which the anode comprises a plurality of elongate strands which are joined together to form a flexible open mesh, at least some of the strands being electrically conductive and comprising carbonaceous material. The strands may for example be of carbon fibre, or they may comprise a metal core, e.g. of copper, and an electrically conductive layer on the core which comprises an organic polymer and a carbonaceous material dispersed in the polymer.

In published GB Patent application 2 175 609 there is described a cathodic protection system in which the anode is an extended area anode comprising a plurality of wires of valve metal, e.g. of titanium, in the form of an open mesh and on the wires a coating of material having anodically-active properties which is substantially non-consumable in operation e.g. a coating of platinum group metal or of an oxide of a platinum group metal. The mesh structure may be formed by weaving or knitting of it may be in the form of a welded structure, that is in the form of a network of strands welded together where the strands cross.

In published application WO 86/06759 there is described a cathodically protected steel reinforced concrete structure comprising an impressed current anode which is a coated valve metal mesh having a pattern of voids defined by a network of valve metal strands. The mesh may be produced by expanding a sheet of valve metal by a factor of at least 10, and preferably by a factor of 15 to 30.

The present invention is concerned with yet a further and potentially very effective type of cathodic protection system of the impressed current type, an example of which is described in published GB Patent Application 2 140 456.

In this published application there is described such a system in which the anode is a coating of electrically - conductive material applied to an external surface of the concrete structure. The electrically - conductive coating may be an electrically conductive paint coating comprising a conductive pigment, with graphite, carbon and coke breeze being mentioned, in an organic binder such as an epoxy resin. The electrically - conductive coating is easily applied and has the advantage that it may be used to provide a decorative finish to the structure. Furthermore, as the coating may be applied by painting or spraying it may easily be applied to a reinforced concrete structure e.g. to vertical surfaces and to the undersides of such structures, preliminary treatment of the structure such as the provision of slots to receive anodes is not required, and the coating and the cathodic protection system are relatively inexpensive. In operation the electrically-conductive coating is connected to a source of direct current electrical power, and the electrically-conductive coating is anodically polarised and the rebars in the concrete structure are cathodically polarised.

A similar cathodic protection system to that disclosed in GB 2140 456 is described in published GB Patent Application 2216140 which is concerned with a method which uses certain spray devices for the application of a liquid paint or cementitious matrix containing fibre or metallic strip or filament to provide a protective anodic coating on the surface of a reinforced concrete structure.

The type of cathodic protection system described in GB 2140456 and GB 2216140 is the subject of significant investigation in the industry an account of its obvious advantages as described above, with the conductive particulate material used invariably being carbonaceous, particularly graphite, rather than being metallic particles. This is understandable in view of the lower density of carbon which aids dispersion into a coating formulation, such as a paint formulation, on account of its lower particle mass.

However, the use of carbonaceous conductive particles (as exemplified by graphite, carbon black, coke breeze, etc.) in such a cathodic protection system does suffer from the disadvantage that such particles become degraded as a result of anodic electrochemical oxidation to carbon dioxide under the acidic conditions prevailing in and adjacent the coating when the coating functions as an anode. Examples of such electrochemical degradation processes are as follows:

$$3H_2O + C \rightarrow 6H^+ + CO_3^{2-} + 4e^-$$

$$O_2 + H_2O + C \rightarrow 2H^+ + CO_3^{2-} + 4e^-$$

These occur with various other anodic electrochemical reactions which form acid at the carbonaceous particle surface, for example:

$$2H_2O \rightarrow O_2 + 4H^+ + 4e^-$$

$$2Cl^- \rightarrow Cl_2 + 2e^-$$

$$Cl + H_2O \rightarrow HOCl + HCl$$

Such degradation of the carbonaceous particles leads to a deterioration in the conductance of the coating, and ultimately to there being no current flow and hence no cathodic protection of the reinforcement.

We now provide a cathodic protection system of the type comprising an anode of an electrically - conductive coating in which the aforementioned disadvantage is mitigated or removed.

According to the present invention there is provided a system for the cathodic protection of a reinforced concrete structure, which system comprises a concrete structure containing steel reinforcement bars and an electrically - conductive coating bonded to an external surface and in electrical contact with the structure, and wherein said electrically conductive coating is a non-cementitious coating comprising a matrix of an organic polymer containing electrical conductivity providing particles of carbon coated with a conductive metal of a type possessing a natural passive oxide film which is itself electrically conductive, and an alkaline buffer material or combination of materials for inhibiting or preventing the build up of acidity in the coating when the cathodic protection system is in operation.

There is also provided according to the invention a non-cementiteous electrically-conductive coating suitable for use as an electrical conductive anode of a cathodic protection system, wherein said coating comprises a matrix of an organic polymer containing electrical conductivity - providing particles of carbon coated with a conductive metal of a type possessing a natural passive oxide film which is itself electrically conductive, and an alkaline buffer material or combination of materials which can act to inhibit or prevent the build up of acidity in the coating when it is used as an electrically conductive anode of an operational cathodic protection system.

There is further provided according to the invention a coating composition suitable for use in the production of a non-cementiteous electrically conductive coating providing a conductive anode of a cathodic protection system, said composition being a non-cementitious homogeneous mixture, optionally but preferably in a liquid carrier medium, comprising a matrix-providing organic polymer and electrical conductivity - providing particles of carbon coated with a conductive metal of a type possessing a natural passive oxide film which is itself electrical conductive, and an alkaline buffer material or combination of materials for inhibiting or preventing the build up of acidity in a coating derived from the composition when it provides a conductive anode of an operational cathodic protection system.

The electrically-conductive coating used in the invention excludes cementitious matrix-providing material such as the various types of hydraulic cement, and the matrix of the coating is provided only by an organic polymer - although of course more than one organic polymer may be used for this purpose.

The metal providing the coating on the carbon particles should be one which possesses a natural protective or so-called passive oxide film on the metal surface which is itself electrically conducting, and so will not be of such a nature as to form an electronically insulating film to prevent or reduce electrical conductance between contacting particles. Examples of suitable metals include nickel, cobalt, silver and platinum, and also metallurgical combinations or alloys such as the various stainless steels, e.g. iron-nickel-chromium alloys or chromium-nickel alloys. The preferred metal is nickel. As an example of a non-suitable metal one can mention titanium which has a natural passive oxide film which is substantially non-conducting.

The passive oxide film aids in the inhibition or prevention of the substrate metal, and hence in the protection the underlying carbon particle.

The metal coating on the carbon particles may be applied by any suitable technique such as in particular vapour deposition, electroplating or electroless plating. It need only be a thin coating which does not add substantially to the dimensions of the carbon particles. Typically the maximum thickness of the metal coating is about 0.3 micrometer, and a typical minimum thickness is about 0.05 micrometer.

The carbonaceous particles may in principle be particles of any electrically conductive form of carbon, such as graphite, carbon black, or coke breeze. However graphite particles are preferred. Further, the carbonaceous particles may in principle of any suitable shape appropriate to the type of carbon - such as spheroidal (or substantially spherical), flake-shaped, or fibre-shaped. However, the carbonaceous particles are preferably in the form of fibres. Particularly preferred carbonaceous particles used in the invention are therefore graphite fibres. More than on type of carbon and/or more than one type of particle shape may be used - although if such a mixture is used it preferably still includes graphite fibres.

Carbonaceous (particularly graphite) fibres used in the invention will generally be in the form of short (chopped) fibres as such fibres can be easily handled in a composition from which the electrically-conductive coating is formed. The fibres will generally have an maximum length of 25 mm, preferably a length of not more than 10 mm and particularly not more than 8 mm. The minimum length of the fibres will usually be 0.1 mm. The average length of the fibres will usually be within the range of from 0.1 to 6 mm.

The level of metal - coated carbonaceous particles in the coating, and the thickness of the coating should be such as to provide an acceptable electrical conductivity in the coating, and this level and thickness will depend at least in part on the nature of the metal coating, and on the shape, type and size of the carbonaceous particulate material. In this regard, it is desirable that the electrically-conductive coating should have a conductivity of at least 0.1 S cm$^{-1}$. Usually the conductivity should be within the range of 0.5 to 1.05 S cm$^{-1}$. In order to achieve these electrical conductivities the coating will generally contain an amount of metal-coated carbonaceous particles of at least 0.5% by weight of the coating, preferably at least 1% by weight. A usual range for the level of metal-coated particles is 0.5 to 40% by weight of the coating.

The electrically - conductive coating will generally have a thickness of at least 10 microns, preferably at least 100 microns, but there will usually be no necessity to use a coating having a thickness greater than 1000 microns, and not usually more than 800 microns. A preferred coating thickness is within the range of from 100 to 1000 microns (typically 600 to 800 microns).

The metal-coated carbonaceous particles, while having significant improved corrosion resistance imparted by the passive metal oxide film, would nevertheless still be vulnerable to corrosion and degradation, with subsequent loss of conductance in the coating, due to the acidic conditions generated at the surfaces of the conductive particles. The breakdown of passivity on such protected metals in the presence of acidic conditions, particularly in the presence of aggressive ions such as chloride, would eventually take place to at least some degree. Accordingly a further essential component of the electroconductive coating is the presence therein of an alkaline buffer material or combination of materials to inhibit or prevent the build up of acidity in the coating and hence to preserve the passive metal oxide film.

The alkaline buffer material or combination of materials is thought to be effective by providing neutralising compounds or ions, such as e.g. hydroxyl ions, under the conditions of operation of the cathodic protection system. Some of these materials are additionally effective as pigments (particularly white pigments) and may therefore be considered as alkaline buffer pigments; they can be used to provide at least part of the pigment in a paint composition which may be used to provide the electroconductive coating.

Preferred alkaline buffer materials/materials used in alkaline buffer combinations are the oxides, hydroxides, phosphates and polyphosphates of Group I, II and III metals of the Periodic Table, alone or in combination with appropriate silicate, borate, carbonate, and aluminate salts of such metals. Preferred materials for use in alkaline buffer systems include the oxide, hydroxide, phosphate, polyphosphate, and silicate compounds of zinc, calcium, potassium, lithium, sodium, barium, magnesium and aluminium.

The level of alkaline buffer material or combination of materials in the coating will generally be within the range of from 0.1 to 50% by weight of the coating, more usually 0.2 to 30% by weight.

The electrically-conductive coating comprises a matrix of an organic polymer, which itself is normally electrically non-conductive, and has a particulate electrically-conductive metal-coated carbonaceous material (as defined) and alkaline buffer material homogeneously distributed in the matrix. The organic polymer may be a thermoplastic organic polymer or it may be a cured, that is cross-linked, organic polymer. The organic polymer matrix, at least when in the form of a coating on the surface of the concrete structure, should of course be water-insoluble in order that the matrix of the coating shall not be attacked by the elements to which the coating will be exposed during operation of the cathodic protection system, e.g. rainwater. However, the organic polymer may be water-dispersed prior to application to the surface of the concrete structure provided the polymer when in the form of a coating on the surface of the concrete structure may be insolubilised, e.g. by cross-linking of the resin. The organic polymer should also be resistant to attack by substrates produced by anodic reactions during operation of the cathodic protection system.

Suitable thermoplastic organic polymers include olefin homopolymers and copolymers, e.g. polyethylene, styrene homopolymers and copolymers, vinyl chloride homopolymers and copolymers, polybutadiene, polycarbonate, acrylic and methacrylic homopolymers and copolymers, chlorinated polymers, e.g. chlorinated polyethylene and chlorinated elastomers, e.g. chlorinated polybutadiene, polyamides, polyesters and polyurethanes. Suitable curable resins include epoxy resins and polyester resins.

It is envisaged that acrylic and methacrylic homopolymers and copolymers will be of particular use as the matrix polymer. Such polymers will be derived from monomeric material comprising, in an amount of usually $\geq 50$ weight % of the monomeric material used for polymerisation, of at least one ester of acrylic or methacrylic acid of formula $$CH_2=CR^1CO_2R^2$$

where $R^1$ is H or methyl and $R^2$ is alkyl or cycloalkyl of 1 to 20 carbon atoms more usually 1 to 10 carbon atoms such as, for example, the methyl ethyl, propyl (both isomers), butyl (all isomers), 2-ethylhexyl, hexyl, cyclohexyl, n-octyl, lauryl acrylates and methacrylates. Other types of monomer, such as stryene, acrylic acid, methacrylic acid, acrylonitrile or methacrylonitrile may be copolymerised with such (meth)acrylates. Such acrylic and methacrylic polymers may be non-crosslinkable or may be crosslinkable by the inclusion of appropriate multifunctional monomer(s) in the monomeric material to be polymerised.

More than one organic polymer may be of course be used for providing the polymeric matrix.

The electroconductive coating may optionally include other components in addition to those discussed above. Examples of these are fillers (such as $CaCO_3$, $BaSO_4$ and mica), pigments other than those which may comprise the alkaline buffer (such as $TiO_2$), plasticisers (used e.g. to increase coating flexibility), heat and light stabilisers, and antioxidants.

The composition from which the electroconductive coating is derived comprises a homogenous mixture of the various components used for providing the coating, optionally carried in a liquid carrier medium. Such compositions may be produced by any convenient mixing process provided it results in a homogeneous mixture of the components of the composition.

Where the composition does not contain a liquid carrier medium, the composition may be formed by mixing processes which are conventional in the plastics and rubber processing art, for example, by use of a bladed mixer, especially such a mixer which imparts high shear to the components of the composition, by use of a twin-roll mill, or by use of a screw extruder. Coating processes which may be used to produce the conductive coating from the such compositions include film-formation by calendering, as on a twin roll mill, compression moulding in a mould, injection moulding and extrusion, and adhering the film to the concrete substrate. Alternatively a molten composition may be prepared and applied to the concrete, followed by solidification on the surface of the structure.

Where, as is preferred, the composition comprises a liquid carrier medium, such as a (predominately) organic solvent-based carrier liquid or (more preferably) a (predominately) water-based liquid (i.e. a carrier liquid having water as the principle component although minor amounts of organic liquids may still be present if desired), the composition may be produced by conventional paint-forming techniques (using ball mills, bladed mixers, etc.), and in fact the composition will preferably be in the form of a paint composition. Where the paint is aqueous-based, it is particularly useful to use an aqueous latex of the organic polymer as the vehicle for incorporation of the polymer into the composition. Acrylic and methacrylic polymer latices are particularly suitable.

When using such liquid carrier-based compositions (particularly paints) other suitable components appropriate for such compositions may also be incorporated into the composition, such as defoamers, surfactants, dispersants, wetting agents, coalescing solvents, and so on.

The conductive coating may be made from such liquid carrier-based compositions by any suitable technique, for example, by applying the composition by brush, roller, or spray, followed by removal of the carrier liquid components e.g. by causing or allowing the applied coating to dry. A coating of increased thickness may be built up by application of multiple coatings of the composition to the surface of a substrate. Where the organic polymer is a curable resin the liquid medium may be allowed to evaporate and the organic polymer may then be allowed to cure, or may be caused to cure, e.g. by application of heat or by application of electromagnetic radiation. The composition may contain suitable crosslinking agents for this purpose.

In order to provide protection to substantially the whole of the rebars in the concrete structure the coating is preferably applied to those parts of the structure adjacent to the rebars so that there is only a short path for the electrical current to travel between the conductive coating and the rebar.

In order to provide good distribution of electrical current to the conductive coating anode in the cathodic protection system the coating may be in electrical contact with a current distributing wire, or a plurality of such wires, acting as a primary anode(s), the conductive coating being the secondary anode. The wire or wires may be embedded in the coating and in operation they will be connected to a source of electrical power. The wire or wires may be made of platinum or other suitable chemically inert electrical conductor.

The conductive coating preferably has a certain degree of porosity so that products which are produced in operation of the cathodic protection system, and particularly gaseous oxygen and chlorine products by electrolysis of water and sodium chloride respectively, may escape from the concrete structure. The coating is thus preferably not so thick as to be impervious to such gaseous products, and it is preferably also permeable to water vapour in order that a build-up of water at the concrete film interface may be prevented.

The conductive coating may be made of desirable appearance by using appropriate colouring matter. Alternatively or additionally, the coating may be given a suitable non-conductive top coat.

The present invention is further illustrated but in no way limited by reference to the following example.

EXAMPLE

A conductive paint coating formulation is prepared based on the following formulation.

| INGREDIENT | % by weight |
| --- | --- |
| Water | 24 |
| primal AC235K (1) | 38 |
| Preservatives (2) | 0.9 |
| monoethyleneglycol | 5 |
| cellulose thickner | 0.3 |
| potassium tripolyphosphate | 0.2 |
| nickel coated carbon fibre (3) | 1.1 |
| angitan 218 | 0.5 |
| polyvinyl alcohol | 5 |
| mica | 18 |
| bariumhydroxide | 7 |

(1) a polyacrylate resin available from Rohm & Hass
(2) a mixture of carbendazim and N-octylisothiazolin-3-one (available from Thor Chemicals (UK) Ltd and hexahydrotriazine (available from Riedel de Haen).
(3) available from Vaporfab Inc.

The paint composition was applied in a thickness between 400 and 800 microns (dry film thickness) onto cured, artificial chloride steel reinforced RILEM (*) mortar prisms ($24 \times 13 \times 4$ cm$^3$) in which the application of the paint was effected by brush in 3 layers. A platinum-niobium clad copper wire (diameter 1.65 mm) was embedded between the first and second layer. This wire functions as the primary anode. After sufficient curing, under laboratory conditions (20° C./55% RH) for 7 days, the primary anode was electrically connected to the positive terminal of a transformer/rectifier while the reinforcing steel was connected to the negative terminal. The transformer/rectifier was in a constant current mode and allowed for adjustment of the current.

A commercial available solvent-based carbon loaded paint was applied to prisms, at the same thickness (dry film thickness) and cured for the same period.

Current (2.5 mA) was applied to both sets of prisms during a period of 10 days. Subsequently, the current was raised to 5 mA. The required voltage to maintain the current was regulary monitored. The variances of the potential indicated a decrease in conductivity (i.e. a decrease in efficacy). The results are detailed in Table I below.

The results show that the commercial carbon loaded paint started to lose conductivity after a 10 day period whereas the nickel-coated carbon fibre retained substantial conductivity even after days.

TABLE 1

| | | potential (v) | |
|---|---|---|---|
| Days | current (mA) | carbon loaded solvent based paint | Ni/C fibre water based paint |
| 1 | 2.5 | 1.23 | 0.87 |
| 10 | 2.5 | 1.50 | 2.01 |
| 11 | 5 | 7.30 | 2.47 |
| 12 | 5 | 12.00 | |
| 13 | 5 | 17.00 | 4.18 |
| 20 | 5 | >20 | 5.21 |
| 25 | 5 | | 6.58 |
| 31 | 5 | | 9.29 |
| 33 | 5 | | 11.61 |

(*)RILEM: Reunion Internationale des Laboratoires d'Essais et de recherches sur les Materiaux et les constructions. (see also EN 196).

We claim:

1. Cathodic protection system for the cathodic protection of a reinforced concrete structure, which system comprises a concrete structure containing steel reinforcement bars and an electrically-conductive coating bonded to an external surface of and in electrical contact with the structure, and wherein said electrically conductive coating is a non-cementitious coating comprising a matrix of an organic polymer containing electrical conductivity - providing particles of carbon coated with a conductive metal of a type possessing a natural passive oxide film which is itself electrically conductive, and an alkaline buffer material or a mixture thereof which functions to inhibit or prevent the build up of acidity in the coating when the cathodic protection system is in operation.

2. A system as claimed in claim 1 wherein the metal is nickel, cobalt, silver, platinum or a nickel alloy.

3. A system as claimed in claim 1 wherein the carbon is coated with the metal to a thickness of from 0.05 to 0.3 micrometers.

4. A system as claimed in claim 1 wherein the carbon is graphite, carbon black or coke breeze.

5. A system as claimed in claim 1 wherein the particles are in the form of fibres.

6. A system as claimed in claim 5 wherein the fibres have a length from 0.1 to 25mm.

7. A system as claimed in claim 1 wherein the electrically conductive coating is from 10 to 1000 microns thick.

8. A system as claimed in claim 1 wherein the alkaline buffer comprises an oxide, hydroxide, phosphate, polyphosphate or silicate of Group I, II and III metals of the Periodic Table.

9. A system as claimed in claim 1 wherein the matrix is of polymer selected from the group consisting of olefin homo- and co-polymers, vinyl chloride homo- and co-polymers, polybutadiene, polycarbonate, acrylic and methacrylic homo- and co-polymers, chlorinated polymers, polyurethanes, epoxy resins and polyester resins.

10. A system as claimed in claim 9 wherein the polymer is derived from at least one ester of formula $$CH_2=CR^1CO_2R^2$$

wherein
$R^1$ is hydrogen or methyl; and
$R^2$ is $C_{1-20}$-alkyl or cycloalkyl.

* * * * *